United States Patent [19]

Walsworth

[11] Patent Number: 4,632,144

[45] Date of Patent: Dec. 30, 1986

[54] COMBINED FLUID PRESSURE ACTUATED FUEL AND OIL PUMP

[75] Inventor: Frank J. Walsworth, Waukegan, Ill.

[73] Assignee: Outboard Marine Corporation, Waukegan, Ill.

[21] Appl. No.: 749,474

[22] Filed: Jun. 27, 1985

Related U.S. Application Data

[60] Division of Ser. No. 410,497, Aug. 23, 1982, Pat. No. 4,539,949, which is a continuation-in-part of Ser. No. 324,145, Nov. 23, 1981, Pat. No. 4,383,504, and a continuation-in-part of Ser. No. 314,224, Oct. 23, 1983, Pat. No. 4,473,340, and a continuation-in-part of Ser. No. 309,558, Oct. 8, 1981, Pat. No. 4,381,741.

[51] Int. Cl.[4] .............................................. F16K 15/02

[52] U.S. Cl. ........................... 137/505.25; 137/505.26

[58] Field of Search ....................... 137/505.25, 505.26, 137/505.27, 505.28, 505.29

[56] References Cited

U.S. PATENT DOCUMENTS

| | | | |
|---|---|---|---|
| 582,432 | 5/1897 | O'Neil et al. | 137/505.25 |
| 2,426,639 | 9/1947 | O'Leary | 137/505.25 |
| 2,490,113 | 12/1949 | Campbell | 137/505.25 |
| 2,514,458 | 7/1950 | Sinz | 137/505.25 |
| 2,546,677 | 3/1951 | Rockwell | 137/505.25 |

*Primary Examiner*—Ira S. Lazarus

*Attorney, Agent, or Firm*—Michael, Best & Friedrich

[57] ABSTRACT

Disclosed herein is a combined fuel and oil pump comprising a reciprocally movable member for pumping fuel in response to member reciprocation, a reciprocally movable element for pumping oil in response to element reciprocation, and a fluid pressure actuated motor connected to the member and to the element and responsive to a source of alternating relatively high and low pressures for effecting reciprocation of the member and the element at a frequency less than the frequency of the alternation of the relatively high and low pressures.

1 Claim, 3 Drawing Figures

COMBINED FLUID PRESSURE ACTUATED FUEL AND OIL PUMP

RELATED APPLICATIONS

This is a division of Application Ser. No. 410,497 filed Aug. 23, 1982, now U.S. Pat. No. 4,539,949, which, in turn, is a continuation in-part of Application Ser. No. 324,145, filed Nov. 23, 1981, now U.S. Pat. No. 4,383,504, and of Application Serial No. 314,224, filed Oct. 23, 1983, now U.S. Pat. No. 4,473,340, and of Application Ser. No. 309,558 filed Oct. 8, 1981, now U.S. Pat. No. 4,381,741.

BACKGROUND OF THE INVENTION

The invention relates generally to fuel pumping arrangements.

The invention also generally relates to oil pumping arrangements.

The invention also relates generally to fluid pressure actuated motors.

The invention also relates to internal combustion engines and, more particularly, to two-stroke internal combustion engines and to means for supplying such engines with a fuel/oil mixture.

Attention is directed to the Perlewitz U.S. Pat. No. 2,935,057 issued May 30, 1960, to the Sparrow U.S. Pat. No. 3,481,318 issued Dec. 2, 1969, to the Leitermann U.S. Pat. No. 3,653,684 issued April 4, 1972, to the Shaver U.S. Pat. No. 3,913,551 issued Oct. 21, 1975 to the Schreier U.S. Pat. No. 4,142,486 issued Mar. 6, 1979, and to the Beaton U.S. Pat. No. 1,519,478 issued Dec. 16, 1924.

SUMMARY OF THE INVENTION

The invention provides a combined fuel and oil pump comprising means including a reciprocally movable member for pumping fuel in response to reciprocation of the member, means including a reciprocally movable element for pumping oil in response to reciprocation of the element, and motor means connected to the member and to the element and responsive to a source of alternativing relatively high and low pressures for effecting reciprocation of the member and the element at a frequency less than the frequency of the alternation of the relatively high and low pressures.

The invention also provides a fluid pressure actuated motor which can be the motor means of the combined fuel and oil pump and which comprises a housing, a motor piston movable reciprocally in the housing and dividing the housing into a relatively low pressure chamber and a relatively high pressure chamber, means biasing the motor piston so as to displace the motor piston in the direction minimizing the volume of one of the pressure chambers and maximizing the volume of the other of the pressure chambers, means for creating a fluid pressure differential between the high and low pressure chambers so as to displace the motor piston in the direction minimizing the volume of the other pressure chamber and maximizing the volume of the one pressure chamber, means responsive to motor piston movement minimizing the volume of the other pressure chamber for establishing communication between the low and high pressure chambers so as thereby to reduce the pressure differential between the high and low pressure chambers and thereby permit displcement of the motor piston by the biasing means in the direction minimizing the volume of the one pressure chamber and maximizing the volume of the other pressure chamber, and means responsive to motor piston movement minimizing the volume of the one pressure chamber for discontinuing communication between the high and low pressure chambers so as to thereby permit the creation of fluid pressure differential between the high and low pressure chambers by the fluid pressure differential creating means and thereby effect displacement of the motor piston in the direction minimizing the volume of the other pressure chamber and maximizing the volume of the one pressure chamber.

In one embodiment in accordance with the invention, the motor piston, the fuel pumping member and the oil pumping element constitute an integral component.

In one embodiment of the invention, the oil pumping means includes oil discharge means including a valved bore extending in the component between the oil pumping chamber and the fuel pumping chamber.

In one embodiment of the invention, the oil pumping means, the fuel pumping means, and the motor means form parts of a single housing.

In one embodiment of the invention, the movable oil pumping element reciprocates through a given distance, and the oil pumping means includes means varying the output thereof notwithstanding the reciprocation of the oil pumping element through the given distance.

In one embodiment in accordance with the invention, the means for creating a pressure differential between the high and low pressure chambers comprises means adapted to be connected to a source of alternativing relatively high and low pressures and including means permitting flow from the low pressure chamber, and means permitting flow to the high pressure chamber and preventing flow from the high pressure chamber.

In one embodiment in accordance with the invention, the motor also includes pressure relief means connected between the high and low pressure chambers to limit the pressure differential there between.

In one embodiment in accordance with the invention, the means for establishing and disconnecting communication between the high and low pressure chambers includes a port in the motor pistion, a valve member movable relative to the port between open and closed positions, means biasing the valve member away from the port, and means on the housing engageable with the valve member to close the port in response to piston movement minimizing the volume of the high pressure chamber.

The invention also provides an oil pump including oil pumping means comprising a movable element reciprocal through a given distance for pumping oil in response to element reciprocation, a variable volume oil pumping chamber including oil inlet means and oil discharge means, and means for varying the output of the pumping means notwithstanding the reciprocation of the element through the given distance, which output varying means includes an oil piston defining, in part, the oil pumping chamber, an adjustable stop, defining, in part, the oil pumping chamber, and means connecting the element and the piston for displacing the piston in response to movement of the element and for permitting lost motion between the element and the piston in response to engagement of the piston with the stop.

The invention also provides a valve construction comprising a housing, a wall movable in the housing so as to define a chamber which is variable in volume, which wall includes therein a port, a valve member movable relative to the port between open and closed positions, which valve member is normally retained in the closed position during movement of the wall in the direction minimizing the volume of the chamber, a stationary member located for engagement with the valve member so as to initially displace the valve member from the closed position in response to wall movement minimizing the volume of the chamber, whereby to initially open the port, and spring means engaged with the valve member and compressed in response to movement of the valve member in the direction minimizing the volume of the chamber, which spring means is operable, after initial opening of the port, to displace the valve member to the open position, whereby to fully open the port.

The invention also provides an internal combustion engine comprising a crankcase subject to cyclical conditions of relatively high and low pressures defining a crankcase pressure amplitude which varies in accordance with variation in engine speed, and a pressure actuated motor comprising a housing, a movable wall located in the housing and dividing the inversely vary in volume relative to each other, and means for causing reciprocation of the movable wall with a stroke length which varies in accordance with variation in the crankcase pressure amplitude and including means connecting the crankcase to the low and high pressure chambers so as to create therebetween a pressure differential having an amplitude which varies in accordance with variation in crankcase pressure amplitude.

In one embodiment of the invention, the engine also includes a fuel pump comprising a fuel pumping chamber, and a fuel pumping piston reciprocally movable in the fuel pumping chamber to produce fuel flow in response to reciprocation of the fuel pumping system in the fuel pumping chamber, which fuel pumping piston is connected to the movable wall for common movement therewith, together with an oil pump comprising an oil pumping chamber, an oil pumping piston reciprocally movable in the oil pumping chamber to produce oil flow in response to reciprocation of the oil pumping piston in the oil pumping chamber, and means connecting the oil pumping piston to the movable wall for reciprocation of the oil pumping piston so as to avoid pumping oil when the pressure differential is below a given amplitude and so as to increase the rate of oil pumping in accordance with the increase of the amplitude of the pressure differential above the given amplitude.

In one embodiment of the invention, the means for reciprocating the oil pumping system is operable to provide movement of the oil pumping piston in common with the reciprocation of the movable wall during one portion of the reciprocation of the movable wall and is operable to provide lost motion between the movable wall and the oil pumping piston during another portion of the reciprocation of the movable wall.

In one embodiment of the invention, the means for causing reciprocation of the movable wall comprises means biasing the movable wall in the direction minimizing the volume of the high pressure chamber, means connecting the crankcase to the low and high pressure chambers so as to create therebetween a pressure differential having an amplitude which varies in accordance with variation in crankcase pressure amplitude and which is adapted to urge the movable wall in the direction minimizing the volume of the low pressure chamber, a port in the movable wall, a valve member movable relative to the port between open and closed positions, which valve member is releasably held in the closed position by the pressure differential, whereby, when the valve member is in the closed position, the pressure differential displaces the movable wall in the direction minimizing the volume of the low pressure chamber, and spring means biasing the valve member toward the open position and having a spring rate which, relative to variation in the pressure differential, causes displacement of the valve member toward the open position after travel of the movable wall through a first stroke length when the pressure differential is at a first value and causes displacement of the valve member toward the open position after travel of the movable wall through a second stroke length greater than the first stroke length when the pressure differential is at a second value greater than the first value.

Other features and advantages of the embodiments of the invention will become known by reference to the following general description, claims and appended drawings.

IN THE DRAWINGS

Figure 1:
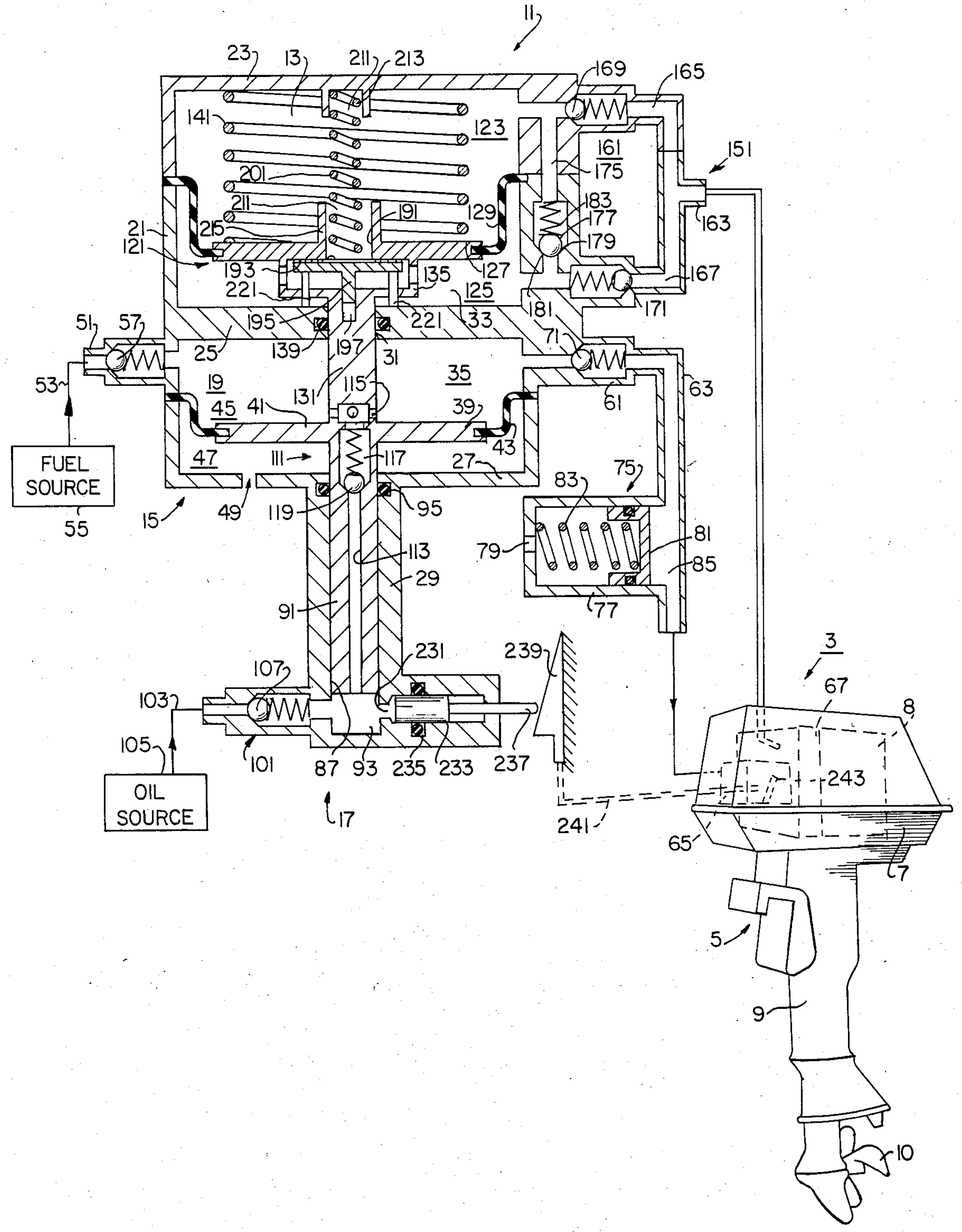
FIG. 1 is a schematic view of one embodiment of a combined fuel and oil pump including a fluid pressure actuated motor.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a marine propulsion device in the form of an outboard motor 3 which includes a propulsion unit 5 including a power head 7 incorporating a two-stroke internal combustion engine 8, together with a lower unit 9 which is secured to the power head 7 and which rotatably supports a propeller 10 driven by the internal combustion engine 8.

Connected to the internal combustion engine 8 is a combined fuel and oil pump 11 including a fluid pressure motor 13 actuated by a source of alternating relatively high and low pressures.

More particularly, the combined fuel and oil pump 11 comprises a housing 15 and, in addition to the fluid pressure motor 13, includes an oil pumping means 17 and a fuel pumping means 19.

Still more particularly, the housing 15 includes a peripheral wall 21, together with a top wall 23, an intermediate wall or partition 25, a bottom wall 27, and a lower extension 29. The intermediate wall 25 includes a central bore or port 31 and divides the housing 15 into an upper compartment 33 and a lower compartment 35.

The fuel pumping means 19 includes a movable wall or member 39 which is located in the lower compartment 35 and which divides the lower compartment 35 into a variable volume fuel pumping chamber 45 located between the intermediate wall 25 and the fuel pumping piston or movable wall or member 39 and a lower or vent chamber 47 which communicates with the atmosphere through a port 49 in the bottom wall 27. The movable wall or member 39 includes a piston 41 which, at its periphery, has attached thereto a flexible membrane or diaphragm 43 which, in turn, is attached to the peripheral wall 21 of the housing 15.

The fuel pumping means 19 also includes, in the peripheral wall 21, a valved fuel inlet 51 which is adapted to communicate through a conduit 53 with a suitable source 55 of fuel and which includes one-way check valve means 57 affording inflow of fuel in response to an increase in the volume of the fuel pumping chamber 45 and which prevents outflow of fuel from the fuel pumping chamber 45.

The fuel pumping means 19 also includes, in the peripheral wall 21, a valved fuel outlet 61 which is adapted to communicate through a conduit 63 with a device, such as a carburetor 65, for feeding a fuel/oil mixture to the crankcase 67 of the two-stroke engine 8. The valved outlet 61 includes one-way check valve means 71 which affords outflow of fuel in response to a decrease in the volume of the fuel pumping chamber 45 and which prevents inflow of fuel.

Preferably, the conduit 63 includes an accumulator 75 in the form of a cylinder 77 which, at one end, communicates with the conduit 63 and which, at the other or outer end, is vented to the atmosphere by a port 79. Located in the cylinder 77 is a piston 81 which is suitably biased by a spring 83 in the direction toward the conduit 63 so as to provide a variable volume accumulating chamber 85 which serves to reduce or eliminate pulsing of fuel at the discharge end of the conduit 63.

The oil pumping means 17 is located in the lower extension 29 and comprises a cylindrical space 87 which extends from the vent chamber 47 in generally aligned relation to the central port 31 in the intermediate wall 25. Located in the cylindrical space 87 is an oil pumping plunger or element 91 which preferably extends integrally from the fuel pumping piston 41, which is reciprocal in the cylindrical space 87, and which, in part, defines a variable volume oil pumping chamber 93. Seal means 95 is provided between the oil pumping plunger or element 91 and the wall of the cylindrical space 87.

The oil pumping means 17 also includes a valved inlet 101 which is adapted to communicate through a conduit 103 with a source 105 of oil and which includes one-way check valve means 107 which affords inflow of oil in response to an increase in the volume of the oil pumping chamber 93 and which prevents outflow of oil.

The oil pumping means 17 also includes a valve outlet 111. While various other arrangements can be employed, in the illustrated construction, the outlet 111 is designed to deliver oil to the fuel pumping chamber 45. More particularly, the oil outlet 111 comprises a bore 113 which extends axially in the oil pumping plunger or element 91, which, at one end, communicates with the oil pumping chamber 93, which, at the other end, includes one or more radial branch ports 115 which communicates with the fuel pumping chamber 45, and which includes, intermediate the inlet 101 and the outlet 111, an enlarged central portion 117 having a one way check valve means 119 which affords outflow of oil to the fuel pumping chamber 45 in response to a decrease in the volume of the oil pumping chamber 93 and which prevents inflow into the oil pumping chamber 93.

The fluid pressure actuated motor 13 is located generally in the upper compartment 33 and is connected to the oil pumping plunger 91 and to the fuel pumping piston 41 so as to effect common reciprocation thereof through a given stroke or distance. More particularly, the fluid pressure actuated motor 13 is responsive to a source of alternating relatively high and low pressures for effecting reciprocation of the fuel pumping piston 41 and the oil pumping plunger or element 91 at a frequency less than the frequency of the alternation of the relatively high and low pressures. Still more particularly, the fluid pressure actuated motor 13 includes a movable wall 121 which divides the upper compartment 33 into an upper, relatively low pressure variable volume chamber 123 and a lower, relatively high pressure variable volume chamber 125. The movable wall 121 includes a central or motor piston 127 which, at its outer periphery, is connected to a flexible membrane or diaphragm 129 which, at its outer periphery, is secured to the peripheral housing wall 21 so as to divide the upper compartment 33 into the before-mentioned relatively low and high pressure chambers.

The central motor piston 127 is also preferably integrally connected with the fuel pumping piston 41 and with the oil pumping plunger or element 91 for common movement. In this last regard, the combined motor piston 127, fuel pumping piston 41, and oil pumping plunger 91 includes a central portion 131 which extends from the fuel pumping piston 41 toward the motor piston 127 and through the central bore or port 31 in the intermediate wall 25, and a connecting portion which forms an open valve cage 135 and which connects the central portion 131 to the motor piston 127. A suitable seal 139 is provided between the intermediate wall 25 and the central portion 131.

The fluid pressure actuated motor 13 further includes means biasing the movable wall 121 so as to displace the movable wall 121 in the direction minimizing the volume of the high pressure chamber 125 and maximizing the volume of the low pressure chamber 123. In the illustrated construction, such means comprises a helical spring 141 which, at one end, bears against the upper or top housing wall 23 and which, at the other end, bears against the motor piston 127.

The fluid pressure actuated motor 13 also includes means 151 for creating a pressure differential between the low and high pressure chambers 123 and 125, respectively, so as to displace the movable wall 121 in the direction minimizing the volume of the low pressure chamber 123 and maximizing the volume of the high pressure chamber 125. While various arrangements can be employed, in the illustrated construction, such means includes means adapted for connection to a source of alternating relatively high and low pressures and including means permitting flow from the low pressure chamber 123 and preventing flow to the low pressure chamber 123, and means permitting flow to the high pressure chamber 125 and preventing flow from the high pressure chamber 125.

Preferably, the source of alternating relatively high and low pressures is the crankcase 67 of the two-stroke engine 8. However, other sources of relatively high and low pressures can be employed. In addition, relatively high and low pressure can refer to two positive pressures above atmospheric pressure, to two negative pressures below atmospheric pressure, or to one positive pressure above atmospheric pressure and one negative pressure below atmospheric pressure.

Still more specifically, the means 151 for creating the pressure differential between the relatively low and high pressure cylinders 123 and 125, respectively, also includes a conduit system 161 including a main conduit 163 adapted to be connected to the source of alternating high and low pressures, such as the crankcase 67 of the two-stroke engine 8, together with a first or low pressure branch conduit 165 which communicates between the low pressure chamber 123 and the main conduit 163 and a second or high pressure branch conduit 167 which communicates between the high pressure chamber 125 and main conduit 163.

Included in the low pressure branch conduit 165 is a one-way check valve 169 which permits flow from the low pressure chamber 123 and prevents flow to the low pressure chamber 123. Located in the high pressure branch conduit 167 is a one way check valve 171 which permits flow to the high pressure chamber 125 and which prevents flow from the high pressure chamber 125.

Accordingly, alternating pressure pulses of relatively high and low pressures present in the main conduit 163 will cause the existence of a relatively high pressure in the high pressure chamber 125 and a relatively low pressure in the low pressure chamber 123, which pressure differential is of sufficient magnitude, as compared to the biasing action of the movable wall biasing spring 141, so that the pressure differential is effective to cause movement of the movable wall 121 from a position in which the high pressure chamber 125 is at a minimum volume to a position in which the low pressure chamber 123 is at a minimum volume.

Preferably, the conduit system 161 also includes means for relieving an excessive pressure differential. In this regard, the conduit system 161 includes a bypass conduit 175 which communicates with the low and high pressure branch conduits 165 and 167, respectively, so as to be in direct communication with the low and high pressure chambers 123 and 125, respectively. The bypass conduit 175 includes a one-way pressure regulating valve 177 including a ball member 179 which is engaged with a seat 181 and held in such engagement by spring 183 designed to release the ball member 179 from engagement with the seat 181 in the event of an excessive differential pressure.

The fluid pressure actuated motor 13 also includes means responsive to piston movement minimizing the volume of the low pressure chamber 123 for establishing communication between the low and high pressure chambers 123 and 125, respectively, so as thereby to reduce or minimize the pressure differential between the low an high pressure chambers 123 and 125, respectively, and thereby permit displacement of the movable wall 121 by the biasing spring 141 in the direction minimizing the volume of the high pressure chamber 125 and maximizing the volume of the low pressure chamber 123. While such means can be provided, at least in part, by a conduit (not shown) bypassing the motor piston 127, in the illustrated construction, such means comprises a central port 191 in the motor piston 127, together with a valve member 193 which is located in the open cage 135 of the combined motor piston 127, fuel pumping piston 41 and oil pumping plunger 91, and which is movable between a closed and an open position. Preferably, the valve member 193 includes a downwardly extending stem 195 which is received in a mating recess or axial bore 197 in the central portion 131 of the combined piston so as to guide movement of the valve member 193 between its open and closed positions.

In addition, the means for effecting communication between the low and high pressure chambers 123 and 125, respectively, includes a helical valve member biasing spring 201 which urges the valve member 193 to the open position and which, at one end, bears against the upper or top wall 23 of the housing 15 and which, at the other end, extends through the port 191 in the motor piston 127 and bears against the upper surface of the valve member 193. The valve member biasing spring 201 is designed so as to be operable to overcome the pressure differential between the low and high pressure chambers 123 and 125, respectively, and thereby to displace the valve member 193 toward the open position as the motor piston 127 approaches the position minimizing the volume of the low pressure chamber 123.

Means are also provided for insuring full opening movement of the valve member 193 in response to approach of the motor piston 127 to the position minimizing the volume of the low pressure chamber 123. Such means is provided in the low pressure chamber 123 and comprises means defining an intermediate chamber 211 communicating with the motor piston port 191 and providing resistance to flow from the intermediate chamber 211 to the low pressure chamber 123 upon initial opening of the valve member 193 so as thereby to effect reduction in the pressure differential between the high pressure chamber 125 and the intermediate chamber 211 and thereby to cause movement of the valve member 193 to the full opened position. Such movement substantially reduces the pressure differential between the low pressure chamber 123 and the high pressure chamber 125, and thereby permits movement of the movable wall 121 to minimize the volume of the high pressure chamber 125 in response to the action of the motor piston biasing spring 141. While various arrangements can be employed, in the illustrated construction, such means comprises an annular flange or ring 213 extending inwardly of the low pressure chamber 123 from the top wall 23 of the housing 15 and in radially outward relation from the valve member biasing spring 201 and in radially inward relation from the motor piston biasing spring 141. In addition, such means comprises a cooperating annular flange or ring 215 extending from the motor piston 127 toward the housing top wall 23 and movable into telescopic relation to the flange or ring 213 as the motor piston 127 approaches the end of the stroke minimizing the volume of the low pressure chamber 123 so as to telescopically form the intermediate chamber 211 and to provide resistance to flow from the intermediate chamber 211 to the low pressure chamber 123.

Such resistance to flow between the intermediate chamber 211 and the low pressure chamber 123 causes deminishment in the resistance to flow or pressure drop between the high pressure chamber 125 and the intermediate chamber 211, thereby assuring action of the valve member biasing spring 201 to effect displacement of the valve member 193 to its fully open position.

The fluid pressure actuated motor 13 also includes means responsive to piston movement minimizing the volume of the high pressure chamber 125 for discontinuing communication between the low and high pressure chambers 123 and 125, respectively, so as to thereby permit the creation of fluid pressure differential between the low and high pressure chambers 123 and 125 by the fluid pressure differential creating means and thereby also to effect displacement of the motor piston 127 in the direction minimizing the volume of the low pressure chamber 123 and maximizing the volume of the high pressure chamber 125. While other arrangements can be employed, in the illustrated construction, such means comprises a plurality of studs or posts 221 which extend upwardly from the intermediate partition or wall 25 toward the valve member 193 and through the open valve cage 135 for engagement with the valve member 193 to seat the valve member 193 in the closed position as the motor piston 127 approaches the position minimizing the volume of the high pressure chamber 125.

Thus, in operation, the presence of alternating high and low pressures in the conduit system 161 causes (assuming the valve member 193 to be in the closed position) buildup and maintenance of higher pressure in the relatively high pressure chamber 125 and reduction and maintenance of low pressure in the low pressure chamber 123. The pressure differential thus created causes displacement of the movable wall 121, including the motor piston 127, against the action of the motor piston biasing spring 141, to the position minimizing the volume of the low pressure chamber 123. As the motor piston 127 approaches the position minimizing the volume of the low pressure chamber 123, the valve member biasing spring 201 serves to open the motor piston port 191 by displacing the valve member 193 to the open position and thereby to reduce or minimize the pressure differential and permit displacement of the movable wall 121 by action of the biasing spring 141 to the position minimizing the volume of the high pressure chamber 125. During such movement, and in the absence of a pressure differential, the valve member 193 remains in the open position under the action of the valve member biasing spring 201.

Upon approach of the movable wall 121, including the motor piston 127, to the position minimizing the volume of the high pressure chamber 125, the studs 221 engage the valve member 193 to cause movement thereof to the closed position. With the motor piston port 191 thus closed, the pressure differential is again created and the movable wall 121 is again displaced in the opposite direction to commence another cylce of operation. As the fuel pumping 41 and the oil pumping plunger 91 have common movement with the motor piston 127, the fluid actuated motor 13 causes reciprocation of these components at a frequency less than the frequency exciting the motor 13, i.e., less than the rate of alternation of the high and low pressures in the source.

Preferably, means are provided for selectively adjusting the discharge rate of the oil pumping means 17, notwithstanding displacement of the oil pumping plunger 91 through a generally constant stroke. While various other arrangements can be employed, in the illustrated construction, such means comprises a subchamber 231 which extends from the oil pumping chamber 93 and which includes therein a floating piston 233. A suitable seal 235 is provided between the floating piston 233 and the wall of the subchamber 231. The floating piston 233 includes, at the outer end thereof, a portion 237 which extends outwardly of the subchamber 231 and which is engaged by a cam 239 which is connected by a suitable linkage 241 shown in dotted outline to the engine throttle 243 and which is, accordingly, selectively positionable in accordance with selective positioning of the engine throttle 243. The cam 239 thus variably restricts outward movement of the floating piston 233 so as to thereby control the effective pumping stroke of the oil pumping plunger 91. A more detailed description of the arrangement for varying the discharge rate of the oil pumping means 17 can be found in my co-pending Application Ser. No. 324,145 which is incorporated herein by reference.

The combined fuel and oil pumping device 11 can be mounted to the block of the two-stroke engine 8 so as to afford immediate connection to the engine crankcase 67 and can be connected to remote sources of oil and fuel. Alternately, if desired, the combined fuel pump and oil pump 11 can be located at a remote location more or less adjacent to or with the sources of fuel and oil and a conduit (not shown) can extend between the crankcase 67, or other source of alternating high and low pressures, and the combined fuel and oil pumping device 11.

Figure 2:
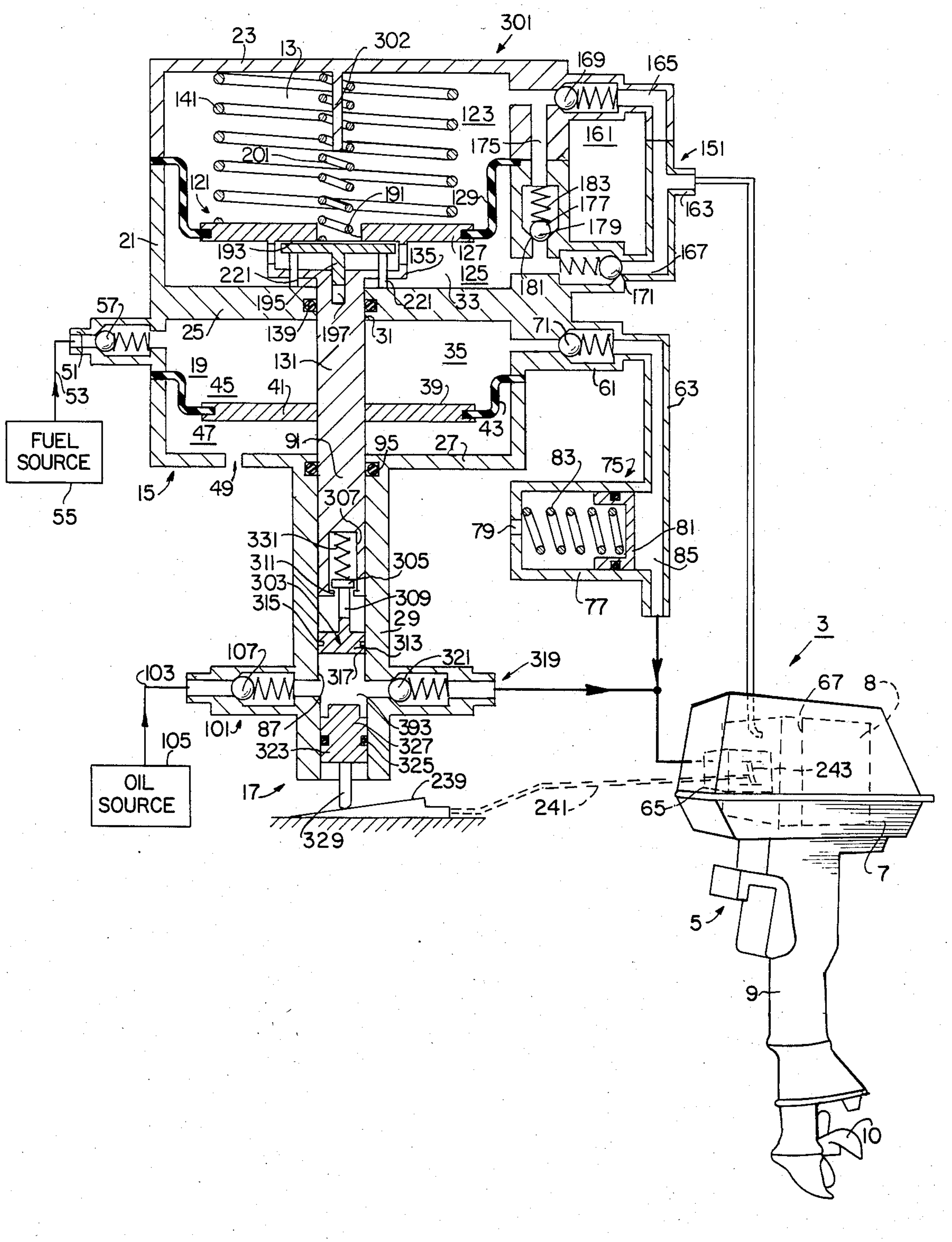
FIG. 2 is a schematic view of another embodiment of a combined fuel and oil pump including a fluid pressure actuated motor.

Shown in FIG. 2 is another embodiment of a combined fuel and oil pump 301 in accordance with the invention. The construction shown in FIG. 2 is generally identical to that shown in FIG. 1, and the same reference numeral have applied for like components, except for the arrangement for insuring full opening of the valve member 193 and the arrangement for varying the amount of oil flow and the oil discharge arrangement.

With respect to the arrangement or means for insuring full opening movement of the valve member 193 in response to approach of the motor piston 127 to the position minimizing the volume of the low pressure chamber 123, in the construction illustrated in FIG. 2, the rings 213 and 215 have been omitted, thereby also omitting provision of the intermediate chamber 211. Instead, there is provided a member or post 302 which fixedly depends downwardly from the top housing wall 23 in position for engaging the valve member 193 as the movable wall 121 minimizes the volume of the low pressure chamber 123. Such engagement causes "cracking" or slight opening of the port 191, thereby somewhat diminishing the pressure differential across the movable wall 121. Such diminishment of the pressure differential facilitates immediately subsequent operation of the poppet valve member biasing spring 201 to displace the valve member 193 so as to fully open the port 191 and thereby to substantially eliminate the pressure differential and obtain wall movement in the direction minimizing the volume of the high pressure chamber 125 under the action of the movable wall biasing spring 141. It is also noted that the post 302 serves to stabilize or locate the upper end of the poppet valve member biasing spring 201.

In the embodiment shown in FIG. 2, the oil pumping arrangement includes an oil pumping piston 303 which defines, in part, a variable volume oil pumping chamber 393. The oil pumping piston 303 is slidably engaged by the movable element 91 by means of an upper end 305 of the piston 303 being located in an enclosed central chamber 307 in the movable element 91. A mid portion 309 of the piston 303 extends outwardly of the chamber 307 through an opening 311 and connects the upper end 305 of the piston 303 to a lower portion 313 in the cylindrical space 87. The upper end 305 of the piston 303 is larger than the opening 311 so when the movable element 91 moves upwardly, the piston 303 moves with the movable element 91. Seal means 315 are provided above a lower end 317 of the piston 303 and between the lower portion 313 of the piston and the wall of the cylindrical space 87. The location of the seal means 315 permits the lower end 317 of the piston to extend below the valve inlet 101 and outlet 319.

In the embodiment, the oil pumping means 17 includes a valved outlet 319 which extends coaxially with the valved inlet 101 but on the opposite side of the cylindrical space 87. The outlet 319 includes a one way check valve 321 and affords outflow of oil to the conduit 63 for feeding the oil to the carburetor 65.

In the embodiment shown in FIG. 2, the means for selectively adjusting the discharge rate of the oil pumping means includes an adjustable stop 323 which defines, in part, the oil pumping chamber 393. The adjustable stop 323 is located in the cylindrical space 87 below the inlet 101 and outlet 319. A suitable seal 325 is provided between the adjustable stop 323 and the wall of the cylindrical space 87, and a portion 327 of the adjustable stop above the seal 325 has a diameter less than the diameter of the cylindrical space 87 to permit the upper portion 327 of the adjustable stop to extend above the inlet 101 and outlet 319. The lower end of the adjustable stop 323 includes a portion 329 which extends outwardly of the cylindrical space 87 and which is engaged by the cam 239. The cam 239 operates as previously described.

The oil pumping means also includes biasing means for biasing the oil piston 303 toward the adjustable stop 323. The biasing means comprises a spring 331 between the upper end 305 of the piston and the movable element 91 in the central chamber 307.

In operation, as the movable element 91 moves downward, the oil piston 303 moves downwardly an equal distance. The biasing means or spring 331 is preloaded so that it will not deflect due to either oil pump pressure or seal friction. As the piston 303 moves downwardly, the oil pumping chamber 393 will be reduced in volume and will force oil out through the valved outlet 319. However, when the oil piston 303 contacts the adjustable stop 323, it will move no further and the remaining stroke of the movable element 91 will be taken up or lost by deflecting the biasing means or spring 331. The location of the adjustable stop 323 will, therefore, vary the volume of the oil pumping chamber 393 and the amount of oil pumped by the pumping means.

Figure 3:
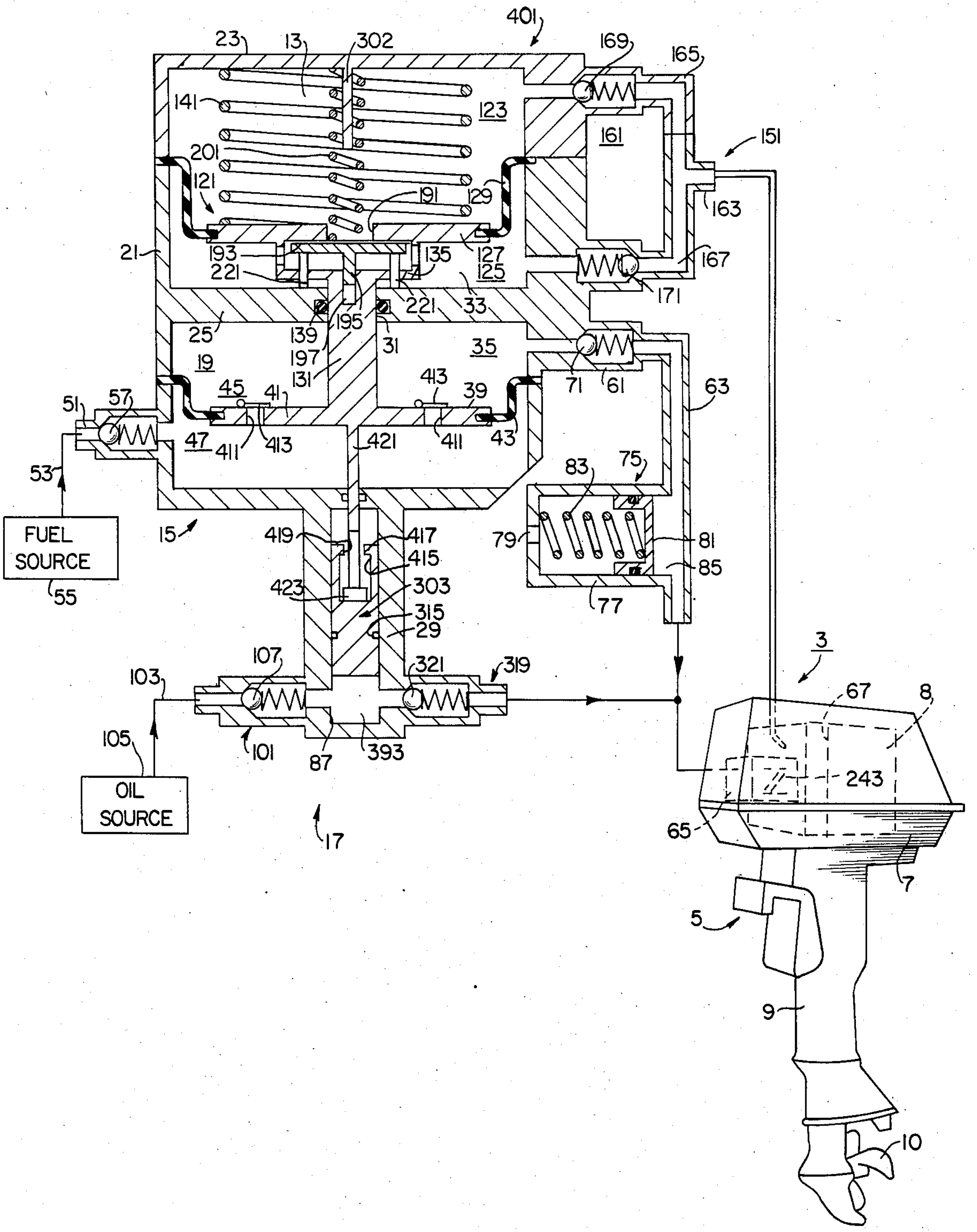
FIG. 3 is a schematic view of still another embodiment of a combined fuel and oil pump including a fluid pressure actuated motor.

Shown in FIG. 3 is still another embodiment of a combined fuel and oil pump 401 which is associated with the internal combustion engine 8 and which embodies various of the features of the invention. The construction shown in FIG. 3 is generally identical to the construction shown in FIG. 2 and the same reference numerals have been applied for like components, except that the fuel pumping arrangement has been slightly modified, except that the oil pumping arrangement has been modified to provide for variation in the output of the oil pump in accordance with engine speed without use of a movable part 239 or element 323 and associated linkage, and except that the one-way pressure-regulating valve 177 has been omitted and the stroke of the motor piston 127 varies in accordance with engine speed. In this last regard, the poppet valve biasing spring 201 has a spring rate which serves to open the port 191 prior to the full stroke of the motor piston 127 when the engine 8 is operating at low speed and which serves to open the port 191 upon completion of the full stroke of the motor piston 127 when the engine 8 is operating at high speed.

More particularly, as is well known, in a two-stroke engine, such as the engine 8, movement of the piston relative to the cylinder and crankcase 67 serves to produce in the crankcase, cyclical conditions of relatively high and low pressures defining a crankcase pressure amplitude which varies in accordance with engine speed, i.e., which increases with engine speed. As, for example, when engine operation is at idle or low speed, the pressures in the crankcase can vary from about +3 psi to about −3 psi, thus providing a crankcase pressure amplitude of 6 psi. Also, for example, when operating at high engine speed, the pressure in the crankcase can vary from about +5 psi to −6 psi, or from about +10 psi to about −1 psi, thus providing a crankcase pressure amplitude of 11 psi.

Under operating conditions, because of the connection of the crankcase 67 to the low and high pressure chambers 123 and 125, respectively, and the one-way check valves 169 and 171, the pressure conditions in the low and high pressure chambers 123 and 125, respectively, rapidly reflect the pressures in the crankcase 67 an provide a pressure differential across the movable motor piston 127, i.e., between the low and high pressure chambers 123 and 125, respectively, which pressure differential has an amplitude approximating the crankcase pressure amplitude.

The poppet valve biasing spring 201, as already indicated, has a spring rate such that partial movement of the motor piston 127 between the positions causing minimum volume of the low and high pressure chambers 123 and 125, respectively, will cause such contraction of the poppet valve biasing spring 201 as to overcome the force on the valve member 193 occurring in response to the pressure differential when the engine 8 is operating at low speed. However, the spring rate is such that, whenever the engine 8 operates at high speed, the force created by the pressure differential is sufficiently great to provide greater travel or full travel of the movable wall 121 or motor piston 127 prior to opening of the port 191. As a consequence, the motor piston 127 is provided with a stroke which varies with engine speed, i.e., is provided with a stroke which increases in length with engine speed.

The fuel pumping arrangement employed in the construction shown in FIG. 3 varies from that shown in FIGS. 1 and 2 by placing the valved fuel inlet 51 in communication with the lower chamber 47 (which is, of course, not vented). In addition, the fuel pumping piston 39 is provided with one or more apertures 411, each having associated therewith a one-way check valve member 413 affording flow from the lower chamber 47 to the upper chamber 45 and preventing flow from the upper chamber 45 to the lower chamber 47. The stroke of fuel pumping member or piston 39 is identical to the stroke of the motor piston 127 and hence the amount of fuel pumped will vary in accordance with engine speed, i.e., will increase with increasing engine speed.

If desired, a fuel pump construction identical to that shown in FIGS. 1 and 2 could also be employed.

The oil pumping arrangement differs from the construction shown in FIGS. 1 and 2 in that the amount of oil pumped is automatically varied in accordance with engine speed and in that, due to a lost-motion connection between the motor piston 127 and the oil pumping piston 303, oil pumping does not occur until after a first engine speed level, which can be intermediate the low and high engine speeds, and which, above the first engine speed level, increases with increasing engine speed.

In this last regard, the oil pumping piston 303 is connected to the motor piston 127 to provide for common movement therewith during a portion of the motor piston stroke and to provide for lost-motion during another portion of the motor piston 127 stroke. In this regard, the upper end of the oil pumping piston 303 is provided with an axial recess or bore 415 which is defined, at the upper end thereof, by an internal annular flange 417 defining an opening 419, and the motor piston 127 is provided with an extension 421 which projects through the opening 419 provided by the annualar flange 417 and includes, at the lower end, an enlarged head 423 which cannot pass through the opening 419 defined by the annualar flange 417. Thus, initial upstroke movement of the motor piston 127 from the position minimizing the volume of the high pressure chamber 125 does not cause accompanying movement of the oil pumping piston 313. However, before the motor piston 127 reaches the position minimizing the volume of low pressure chamber 123, the head 423 engages the flange 417 to cause common movement of the oil pumping piston 303 with the motor piston 127. Initial downstroke motion of the motor piston 127 does not cause the oil pumping piston movement until the head 423 engages the blind end of the recess or bore 415. Thus, oil pumping operation occurs only at the top of the upstroke of the motor piston movement and at the bottom of the downstroke of the motor piston movement. Accordingly, the oil pumping arrangement disclosed in FIG. 3, provides for little or no pumping at low engine speeds and for increasing oil pumping with increasing speeds above low engine speed.

As in the construction shown in FIG. 2, the oil discharge from the output 319 is conveyed to the fuel discharge conduit 63 for mixture therewith. However, if desired, the discharged oil could be conveyed for mixture with the fuel in either the upper chamber 45 or in the lower chamber 47.

Various of the features of the invention are set forth in the following claims.

I claim:

1. A valve construction comprising a housing, a wall movable in said housing so as to define a chamber which is variable in volume, said wall including therein a port affording flow through said wall, a valve member movable relative to said port between open and closed positions, said valve member being normally retained in said closed position during movement of said wall in the direction minimizing the volume of said chamber, a stationary member located for engagement with said valve member so as to initially displace said valve member from said closed position in response to wall movement minmizing the volume of said chamber, whereby to initially open said port, and spring means engaged with said valve member and compressed in response to movement of said valve member in the direction minimizing the volume of said chamber, said spring means being operable, after initial opening of said port, to displace said valve member to said open position, whereby to fully open said port.

* * * * *